United States Patent
Lee et al.

(10) Patent No.: US 6,754,669 B2
(45) Date of Patent: Jun. 22, 2004

(54) METHOD AND SYSTEM OF GENERATING AN ITEM NUMBER FOR AN ITEM

(75) Inventors: Yeun-Jonq Lee, Taipei (TW); Hui-Shan Ni, Taipei (TW); Hao-Liang Chen, Taipei (TW); Yueh-Wen Chen, Taipei (TW)

(73) Assignee: Elite Intelligence Corp., Taipei Hsien (TW)

( * ) Notice: Subject to any disclaimer, the term of this patent is extended or adjusted under 35 U.S.C. 154(b) by 185 days.

(21) Appl. No.: 09/989,163

(22) Filed: Nov. 21, 2001

(65) Prior Publication Data

US 2003/0023606 A1 Jan. 30, 2003

(30) Foreign Application Priority Data

Jul. 25, 2001 (TW) ........................................ 90118232 A (51) Int. Cl.⁷ .............................................. G06F 17/00
(52) U.S. Cl. ...................................... 707/102; 707/100
(58) Field of Search ................................ 707/100, 102; 705/27, 29

(56) References Cited

U.S. PATENT DOCUMENTS

| | | | | |
|---|---|---|---|---|
| 4,875,162 A | * | 10/1989 | Ferriter et al. ................ | 705/29 |
| 5,231,566 A | * | 7/1993 | Blutinger et al. ............. | 705/27 |
| 2002/0087440 A1 | * | 7/2002 | Blair et al. .................... | 705/29 |
| 2002/0161745 A1 | * | 10/2002 | Call ............................... | 707/1 |
| 2003/0195791 A1 | * | 10/2003 | Waller et al. ................. | 705/10 |

* cited by examiner

Primary Examiner—Uyen Le
(74) Attorney, Agent, or Firm—Troxell Law Office PLLC (57) ABSTRACT

A computer-implemented method of generating an item number for an item is disclosed. First, an item-type table is created and a sequence of specification codes on the item-type table is determined. After creating a code table for each of the specification codes, a specification name for each of the specification code is input into the code table. After inputting representative codes into the code table, an item-type code is input into the item-type table. After inputting a specification description into the item-type table, an item-number-encoding table is created and an item type of the item is selected on the item-number-encoding table. Next, an item-type code of the item is input into the item-number-encoding table, and then specification descriptions of the item type is shown on the item-number-encoding table. After deciding the representative codes according to real properties of the item, the item number of the item is generated.

8 Claims, 7 Drawing Sheets

ITEM-NUMBER-ENCODING TABLE

ITEM-TYPE CODE [ 01 ▼ ] [ VALVE CATEGORY ]

| | | | | | | |
|---|---|---|---|---|---|---|
| MODEL | LIBA ▼ | METRO | Spec 11 | Spec 11 ▼ | Spec 11 |
| SIZE | 10 inch ▼ | T50 | Spec 12 | Spec 12 ▼ | Spec 12 |
| VALVE BODY | BRONZE ▼ | B | Spec 13 | Spec 13 ▼ | Spec 13 |
| VALVE DISC | PLASTIC ▼ | P | Spec 14 | Spec 14 ▼ | Spec 14 |
| VALVE SHAF | IRON ▼ | I | Spec 15 | Spec 15 ▼ | Spec 15 |
| VALVE SEAT | STEEL ▼ | S | Spec 16 | Spec 16 ▼ | Spec 16 |
| Pressure-resisting | WOG 150PSI ▼ | I | Spec 17 | Spec 17 ▼ | Spec 17 |
| Operator | Hand-hold ▼ | H | Spec 18 | Spec 18 ▼ | Spec 18 |
| Electronic Voltage | 110V ▼ | O | Spec 19 | Spec 19 ▼ | Spec 19 |
| Usage | THROTTLINE ▼ | T | Spec 20 | Spec 20 ▼ | Spec 20 |

[ ENCODE ] [ METROT50-BPIS-1-HOTV ] [ METRO 10" Valve ] [ SAVE ] [ QUIT ]

Fig.1

ITEM-TYPE TABLE

Item-Type Code: 01

Item-Type Description: Valve Category

Sequence of Specification Codes: | A | A | A | A | B | B | B | - | C | C | C | - | D | - | E | E | E | | |
positions: 5, 10, 15, 20, 24

| List | Specification code list | | Specification description | Bit numbers | Description | |
|---|---|---|---|---|---|---|
| 4 | Material | ▶ | Body VALVE BODY | 1 | Yes | ▶ |
| 5 | Material | ▶ | Disc VALVE DISC | 1 | Yes | ▶ |
| 6 | Material | ▶ | Shaf VALVE SHAF | 1 | Yes | ▶ |
| 7 | Material | ▶ | Seat VALVE SEAT | 1 | Yes | ▶ |
| 8 | Separator | ▶ | Separator | 1 | No | ▶ |
| 9 | Pressure-resisting | ▶ | Pressure-resisting | 1 | No | ▶ |
| 10 | Separator | ▶ | Separator | 1 | No | ▶ |
| 11 | Others | | | | | |

[QUIT] [SAVE]

Fig. 2

CODE TABLE

Specification Code [ C ]

Specification Name [ Material ]

Code Length [ 1 ]

| Representive code | Meaning & Description |
|---|---|
| I | Cast Iron |
| D | Ductile Iron |
| C | Carbon Steel |
| S | Stainless Steel |
| A | Aluminum Bronze |
| B | Bronze |
| P | Plastic |
| E | EPDM |

[ QUIT ]   [ SAVE ]

ITEM-NUMBER-ENCODING TABLE

| | ITEM-TYPE CODE | 01 ▶ | VALVE CATEGORY | |
|---|---|---|---|---|
| MODEL | LIBA ▶ | METRO | Spec 11 | Spec 11 ▶ | Spec 11 |
| SIZE | 10 inch ▶ | T50 | Spec 12 | Spec 12 ▶ | Spec 12 |
| VALVE BODY | BRONZE ▶ | B | Spec 13 | Spec 13 ▶ | Spec 13 |
| VALVE DISC | PLASTIC ▶ | P | Spec 14 | Spec 14 ▶ | Spec 14 |
| VALVE SHAF | IRON ▶ | I | Spec 15 | Spec 15 ▶ | Spec 15 |
| VALVE SEAT | STEEL ▶ | S | Spec 16 | Spec 16 ▶ | Spec 16 |
| Pressure-resisting | WOG 150PSI ▶ | I | Spec 17 | Spec 17 ▶ | Spec 17 |
| Operator | Hand-hold ▶ | H | Spec 18 | Spec 18 ▶ | Spec 18 |
| Electronic Voltage | 110V ▶ | O | Spec 19 | Spec 19 ▶ | Spec 19 |
| Usage | THROTTLINE ▶ | T | Spec 20 | Spec 20 ▶ | Spec 20 |

| ENCODE | METROT50-BPIS-1-HOTV | METRO 10" Valve | SAVE | QUIT |

ITEM-NUMBER-QUERYING TABLE

○ INPUT ITEM NUMBER DIRECTLY [▼]
○ QUERY ITEM NUMBER FORM SPECIFICATIONS ITEM-TYPE CODE [01 ▼]

[QUERY] [EXIT]

| | | | | |
|---|---|---|---|---|
| MODEL | LIBA ▼ | METRO | Spec 11 | Spec 11 ▶ | Spec 11 |
| SIZE | 10 inch ▼ | T50 | Spec 12 | Spec 12 ▶ | Spec 12 |
| VALVE BODY | BRONZE ▼ | B | Spec 13 | Spec 13 ▶ | Spec 13 |
| VALVE DISC | PLASTIC ▼ | P | Spec 14 | Spec 14 ▶ | Spec 14 |
| VALVE SHAF | IRON ▼ | I | Spec 15 | Spec 15 ▶ | Spec 15 |
| VALVE SEAT | STEEL ▼ | S | Spec 16 | Spec 16 ▶ | Spec 16 |
| Pressure-resisting | WOG 150PSI ▼ | I | Spec 17 | Spec 17 ▶ | Spec 17 |
| Operator | Hand-hold ▼ | H | Spec 18 | Spec 18 ▶ | Spec 18 |
| Electronic Voltage | 110V ▼ | O | Spec 19 | Spec 19 ▶ | Spec 19 |
| Usage | THROTTLINE ▼ | T | Spec 20 | Spec 20 ▶ | Spec 20 |

| | Choice | ITEM NUMBER | ITEM DESCRIPTION |
|---|---|---|---|
| Conclusions | | | |
| | | | |
| | | | |

Fig. 7

METHOD AND SYSTEM OF GENERATING AN ITEM NUMBER FOR AN ITEM

BACKGROUND OF THE INVENTION

1. Field of the Invention

The present invention relates generally to a computer-implemented method of generating an item number for an item, and more particularly, to a computer-implemented generation system allowing an user to create his/her personal encoding way for a variety of kinds of items.

2. Description of the Related Art

Enterprise resource planning (ERP) systems plan and control all resources (such as items and materials) in an enterprise. A typical ERP system provides applications for a user to control production/material management, quality management, plant maintenance, sales and distribution, human resources, and project management.

Material requirement planning (MRP) is the engine of the ERP system that plans the schedules for the purchase and manufacturing of materials. The plans for other resources are generally derived from it. MRP calculates the planned order released from the fundamental data. Key fundamental data for MRP includes the item master, bill of material, routing, and bill of resources.

The item master file describes the attributes of a company's items, which include raw materials, works-in-process, semi-finished goods, and finished goods. The number of attributes of an item is generally very large, and thus they are normally divided into five groups: general attributes, attributes for planning, attributes for inventory, attributes for inspection, and attributes for costing. These include parts number, name specification, unit of measurement for quantity, product line, product sub-line, inventory type, inventory sub-type, drawing number, engineering change number, etc. The product line and sub-line are used to sort out the items for item master reports, material requirement reports, sales amount reports, cost reports, etc. The inventory type is usually defined as the material of the parts, such as iron, steel, brass, plastic, etc., and is used to analyze the cost of the parts. Inventory sub-types are generally used when further classification is required. The drawing number is used to fetch the drawings from the computer aided design (CAD) system and attach them to the manufacturing or purchasing documents. The engineering change number is used to link the ERP system to an outside workflow control system for monitoring the documents of an EC (Electronic Commerce) in progress, or for retrieving the record of the last EC when it has been closed.

However, the conventional ERP systems generally have the following drawbacks:

1. Each ERP system has its encoding way for a variety of kinds of items. The encoding methods between different ERP systems have large differences. Therefore, it is necessary to perform a transformation procedure between two ERP systems when a user or an industry chooses a new ERP system. The transformation procedure is terribly troublesome.
2. Because it is necessary to perform a transformation procedure between two ERP systems according to the prior art, a long transitional period is required for the user or the industry to adapt the new ERP software. For this reason, the education period and cost for the purchase people, the production management people, and the material management-people can be very large.
3. ERP systems are also used by research people, purchase people, and sales people. For the industries having plenty of items, it's very hard for users to remember the item number of each item. For this reason, when the research people, purchase people, and sales people are filling out purchase orders, they can find out the necessary item numbers only by manually checking a table book. It's very troublesome for them.

SUMMARY OF THE INVENTION

Accordingly, it is a primary object of the present invention to provide a computer-implemented method of generating an item number for an item.

It is another object of the present invention to provide a computer-implemented system of generating an item number for an item.

It is further another object of the present invention to provide a computer-implemented system for querying an item number for an item.

A method of generating an item number for an item is disclosed in the present invention. First, an item-type table is created and then a sequence of specification codes is determined on the item-type table. Next, a code table for each kind of the specification codes is created. After inputting a specification name for each kind of the specification code into the code table, a several of representative codes are input into the code table in sequence. After that, an item-type code is input into the item-type table, and then a specification description is input into the item-type table for each kind of the specification codes.

Thereafter, an item-number-encoding table is created, and an item type of the item is selected from the item-number-encoding table. After inputting an item-type code of the item into the item-number-encoding table, specification descriptions of the item type are shown on the item-number-encoding table. After deciding the representative codes according to the real properties of the item, the item number of the item is generated by clicking a button positioned on the item-number-encoding table.

According to one embodiment of the present invention, after generating the item number for each of the items, steps of querying an item number of a specific item are disclosed. First, an item-number-querying table is created. After choosing an option of inputting an item number directly, a part of the item number of the specific item is input into the item-number-querying table. Thereafter, items with item numbers containing the part are disclosed. Finally, the item numbers of the items are shown on the item-number-querying table.

According to another embodiment of the present invention, after generating the item number for each of the items, steps of querying an item number of a specific item are disclosed. First, an item-number-querying table is created. After choosing an option of querying item numbers from specifications, an item-type code of the specific item is decided. After showing corresponding specification properties of the item-type code on the item-number-querying table, the specification properties are filled according to the real properties of the specific item. Finally, the item number of the specific item is shown on the item-number-querying table.

According to the present invention, the item number is composed of the representative codes, and the representative codes represent all of the important specifications of an item. For this reason, it is not necessary for a user to realize the important specifications and properties of an item by querying on the computer. The convenience and efficiency of purchasing, checking, importing and exporting items can be significantly enhanced. The present invention allows a user to create his/her personal encoding way for a variety of kinds of items. The user can use the customary encoding way of his/her industry without transformation. No transitional period is required for the user to adapt the new ERP software. For this reason, the education period and cost for the purchase people, the production management people, and the material management people can be largely decreased.

BRIEF DESCRIPTION OF THE DRAWINGS

The accompanying drawings forming a material part of this description, in which.

DESCRIPTION OF THE PREFERRED EMBODIMENTS

The present invention provides development tools in the form of a computer program for generating an item number for an item, and more particularly, provides a computer-implemented generation system allowing a user to create his/her personal encoding way for a variety of kinds of items. The ERP software and system can be applied on any type of computer systems and any type of operation environment.

Figure 1:
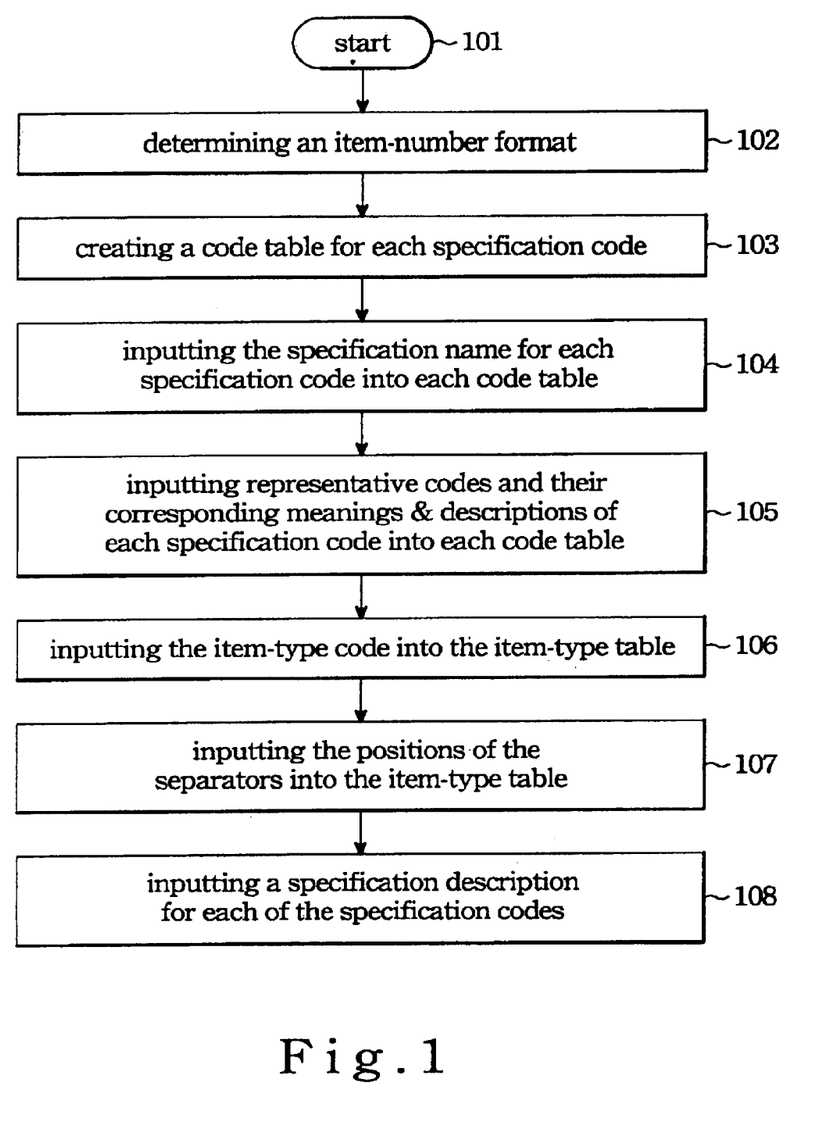
FIG. 1 is a flow diagram of building a form for generating item numbers in accordance with the present invention.
Figure 2:
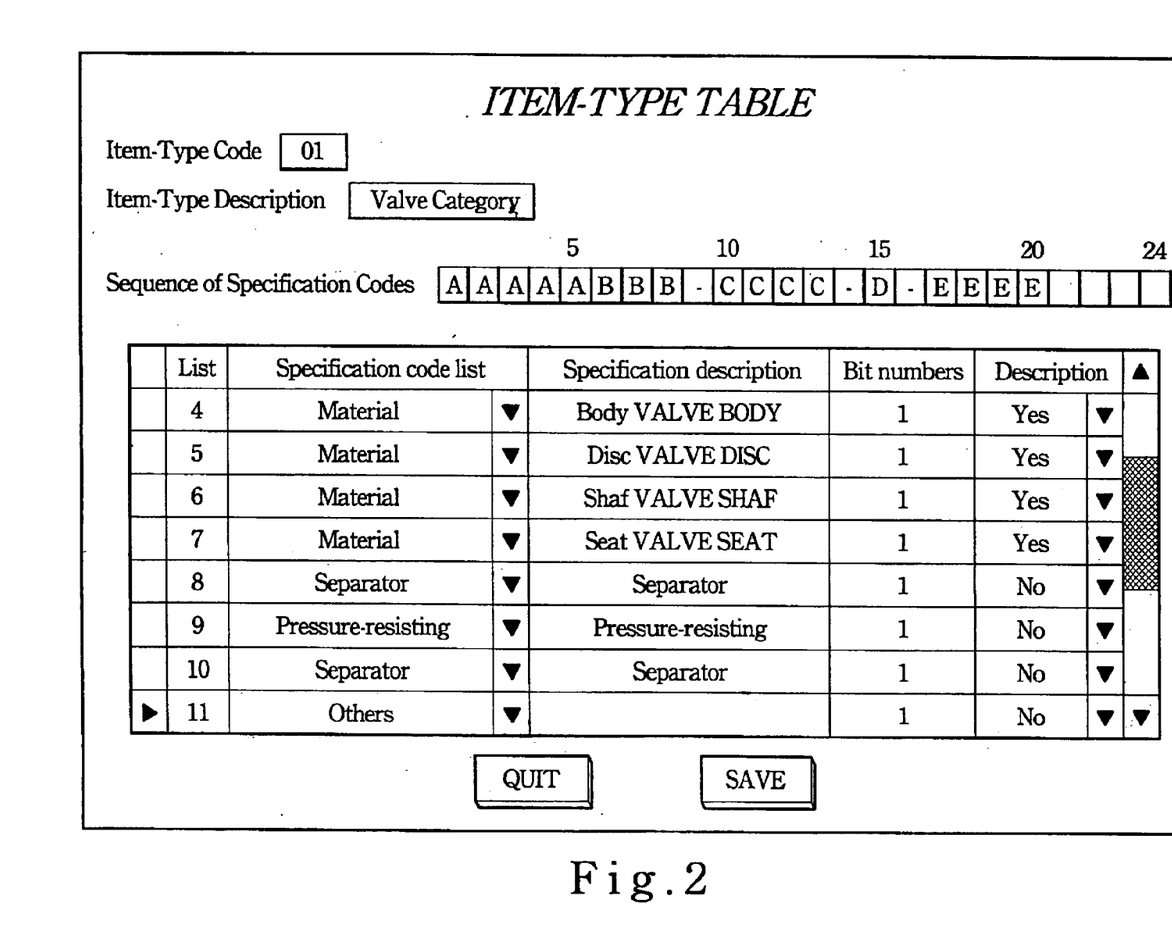
FIG. 2 illustrates an item-type table for each item in accordance with the present invention.

Referring first to FIG. 1, a flow diagram of building a form for generating item numbers in accordance with the present invention is disclosed. When the procedure starts (step 101), an item-number format comprising the sequence of the specification codes, the bit numbers of each specification code, and the position of each separator is determined (step 102). FIG. 2 illustrates an item-type table showing an example of arranging five specification codes using 20 bits as the item-number format, wherein "A" represents "MODEL NUMBER" using 5 bits; "B" represents "SIZE" occupying 3 bits; "C" means "MATERIALS" occupying 4 bits; "D" represents "PRESSURE-RESISTING DEGREE" with only 1 bits; "E" means "ACCESSORIES" using 4 bits. In addition, there are 3 separators at the ninth, fourteenth, and sixteenth bits. In addition to the item-number format, the item-type table further comprises Item-type Code, Item-type Description, and a main table. The main table is composed of "Specification Code List", "Specification Description", "Bit Numbers", etc., as shown in FIG. 2. According to the example provided in FIG. 2, the item-type description is "Valve Category". The list numbers from 4 to 7 correspond to four kinds of material specifications, and also correspond to four "Cs" on the item-number format. The four kinds of material specifications are shown as "Specification Description" to be "Valve Body", "Valve Disc", "Valve Shaf", and "Valve Seat". Of course, a series of functional buttons such as "Quit" and "Save" are provided on the item-type table.

Figure 3:
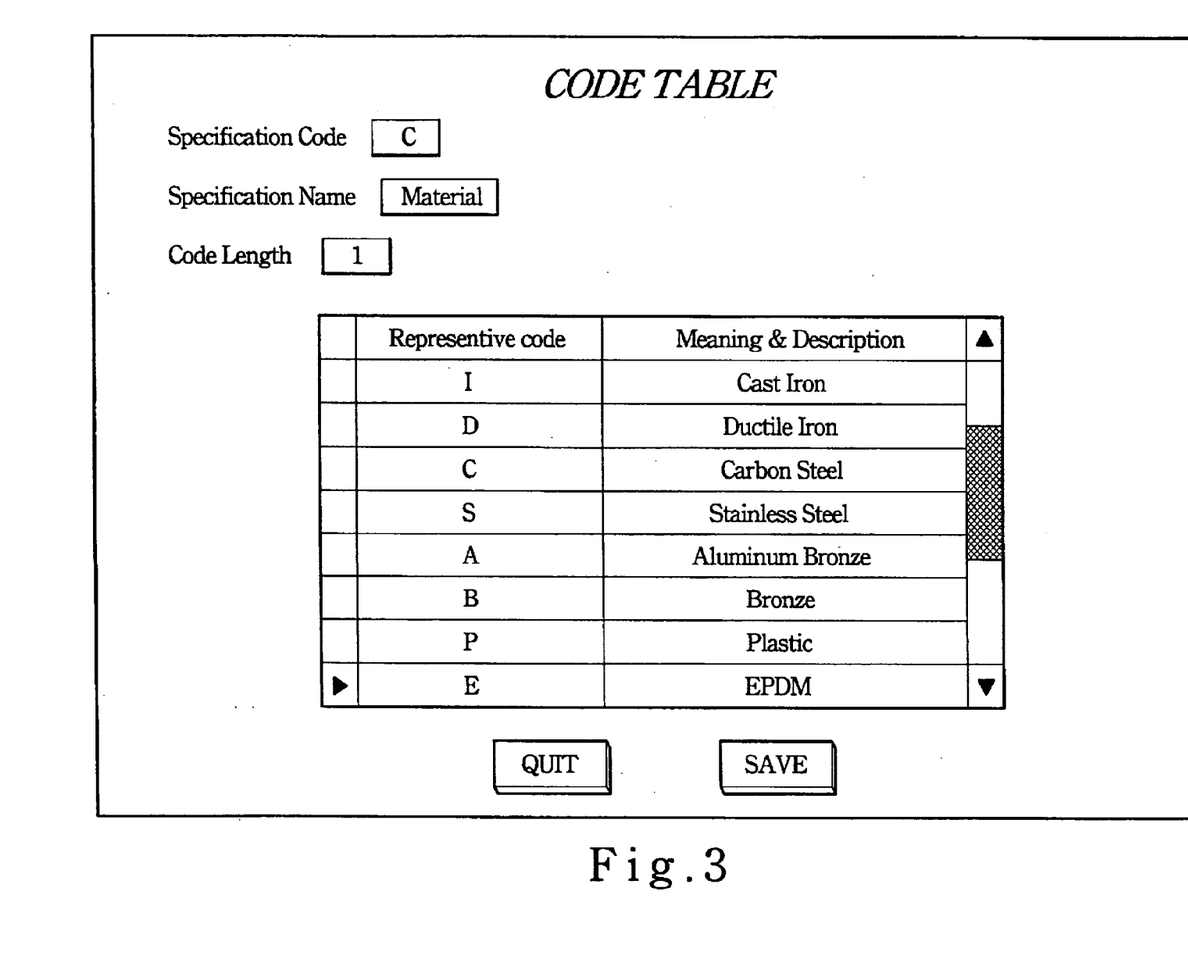
FIG. 3 illustrates a code table for each specification code in accordance with the present invention.

After that, a code table is automatically created for each specification code (step 103). FIG. 3 illustrates an example of the code table for the specification code "C" in accordance with the present invention. There are further "Specification Name" and "Code Length" on the code table. According to the example provided by FIG. 3, the specification name is "Material", and its code length is "1". The main part of the code table is a table comprising "Representative Codes" and their "Corresponding Meanings & Descriptions", as shown in FIG. 3. Of course, a series of functional buttons such as "Quit" and "Save" are provided by the code table.

Next, the specification name (such as MATERIAL in FIG. 3) for each specification code is input into each code table according to the item-number format (step 104). Thereafter, Representative Codes (such as "I" in FIG. 3) and their corresponding Meanings & Descriptions (such as "CAST IRON" in FIG. 3) of each specification code are input into each code table (step 105). For instance, the Representative Code "I" means Cast Iron, the Representative Code "D" corresponds to Ductile Iron, and the Representative Code "C" means "Carbon Steel".

Next, the item-type codes are input into the item-type table (step 106), and the positions of the separators are input into the item-type table according to the item-number format (step 107). Finally, a Specification Description for each of the Specification Codes is also input into the item-type table according to the sequence of the specification codes of the item-number format (step 108).

Figure 4:
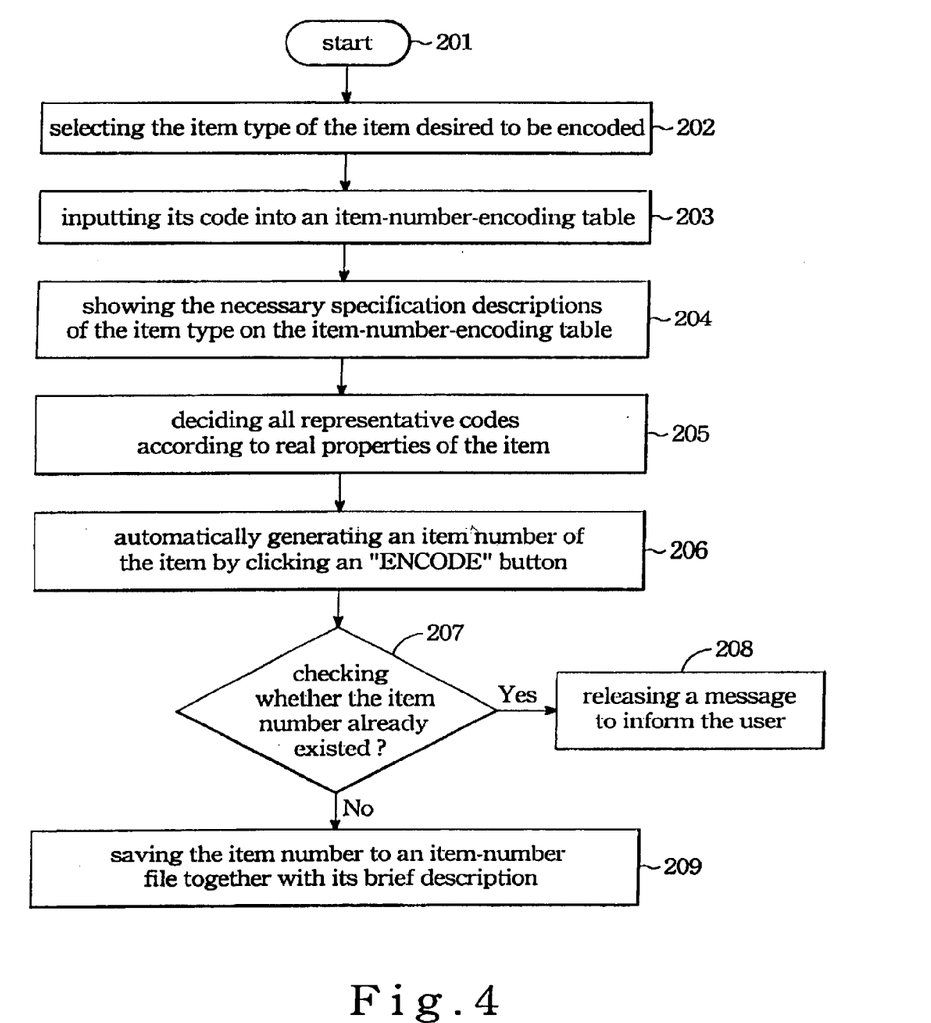
FIG. 4 is a flow diagram of automatically generating an item number for each item in accordance with the present invention.

FIG. 4 illustrates a flow diagram of automatically generating an item number for each item in accordance with the present invention. When the generation procedure begins (step 201), the item type of the item desired to be encoded is selected (step 202), and its Item-Type Code is input into an item-number-encoding table as shown in FIG. 5 (step 203).

Figure 5:
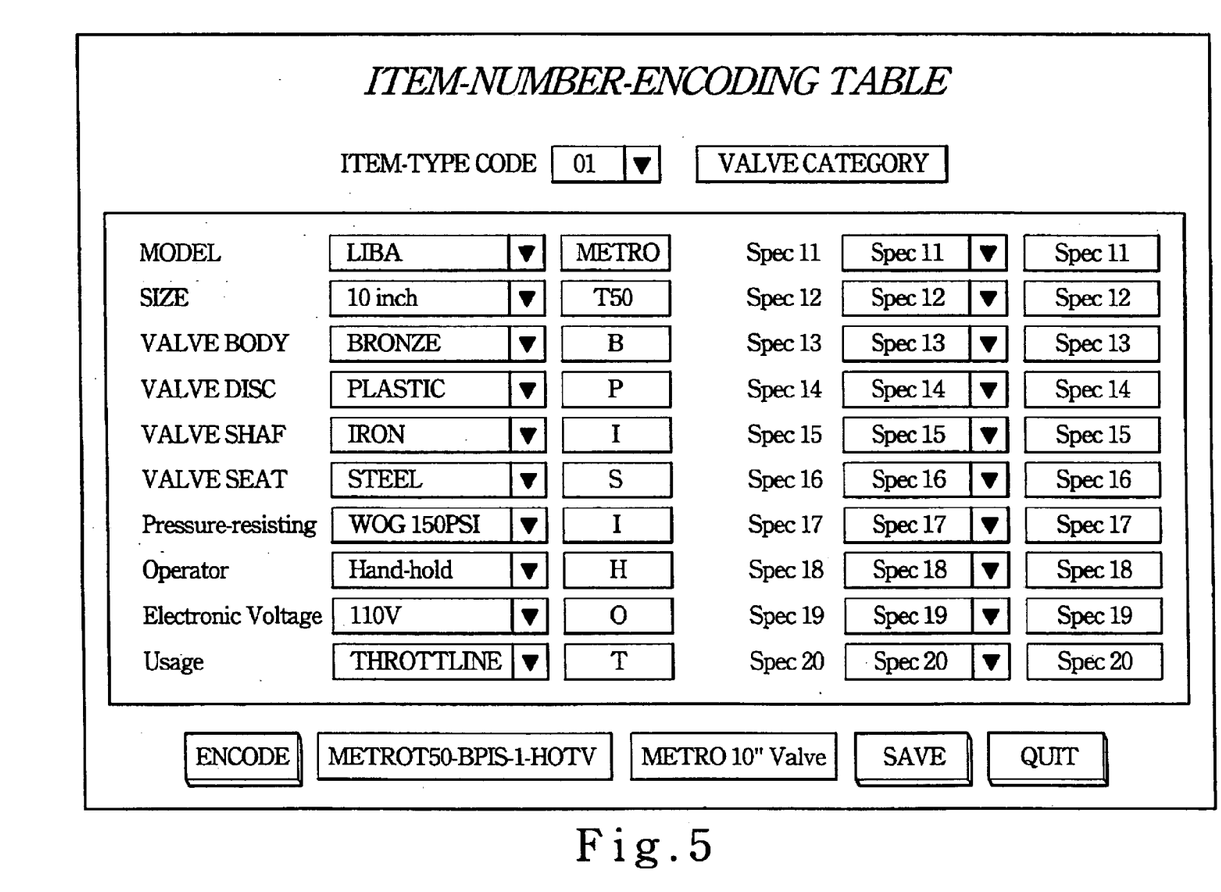
FIG. 5 illustrates an item-number-encoding table in accordance with the present invention.

FIG. 5 illustrates an item-number-encoding table in accordance with the present invention. The item-number-encoding table comprises the Item-Type Code and a main table. The Item-Type Code could be decided by selecting from a pull-down manual, or by directly inputting. The main table is composed of "Model", "Size", the four kinds of "Material Specification" ("Valve Body", "Valve Disc", "Valve Shaf", and "Valve Seat"), "Pressure-Resisting", "Operator", "Electronic Voltage", "Usage", and so on.

After that, the necessary Specification Descriptions of the item type are shown on the item-number-encoding table (step 204). Thereafter, all Representative Codes are decided according to real properties of the item (step 205). The Specification Codes are decided by selecting from a pull-down manual, or by directly inputting. For instance, "Size" is selected to be "10 inch", "Valve Body" is chosen to be "Bronze", "Valve Disc" is selected to be "Plastic", "Valve Shaf" is selected to be "Iron", and "Valve Seat" is chosen to be "Steel". As the "Specification Codes" are decided, their corresponding "Representative Codes" are shown on the item-number-encoding table. For example, the "Valve Body" shows "B", "Valve Disc" illustrates "P", "Valve Shaf" shows "I", and "Valve Seat" illustrates "S".

After that, an item number of the item (METROT50-BPIS-1-HOTV in FIG. 5) is automatically generated by clicking an "ENCODE" button on the item-number-encoding table (step 206). It is then checked whether the item number already existed (step 207). If the item number already existed, a warning message is released to inform the user (step 208). Therefore, all of the items can be encoded without repeat. On the other hand, if the item number didn't exist yet, it is saved to an item-number file together with its brief description (step 209).

According to the present invention, the item number is composed of the representative codes, and the representative codes represent all of the important specifications of an item. For this reason, it is not necessary for a user to realize the important specifications and properties of an item by querying on the computer. The convenience for purchasing, checking, importing and exporting items can be significantly enhanced. The present invention allows a user to create his/her personal encoding way for a variety of kinds of items. The user can use the customary encoding way of his/her industry without transformation. No transitional period is required for the user to adapt the new ERP software. For this reason, the education period and cost for the purchase people, the production management people, and the material management people can be largely decreased.

Figure 6:
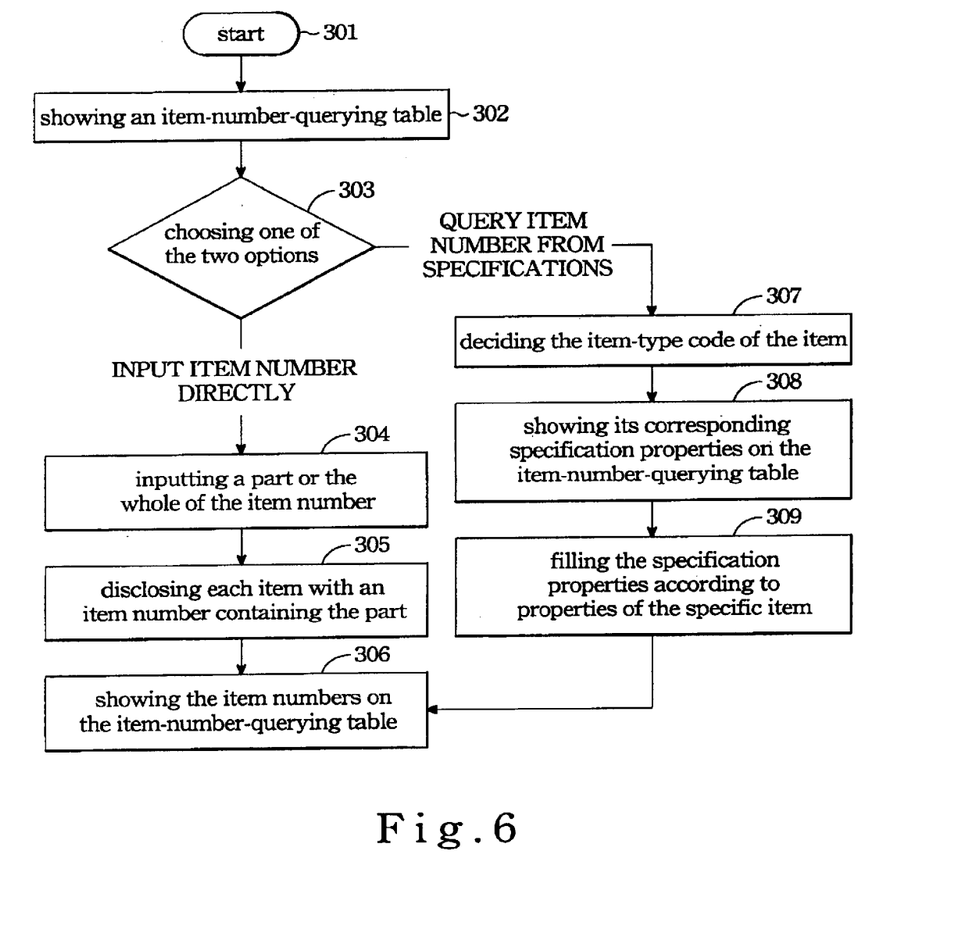
FIG. 6 is a flow diagram of querying the item number for each item in accordance with the present invention.
Figure 7:
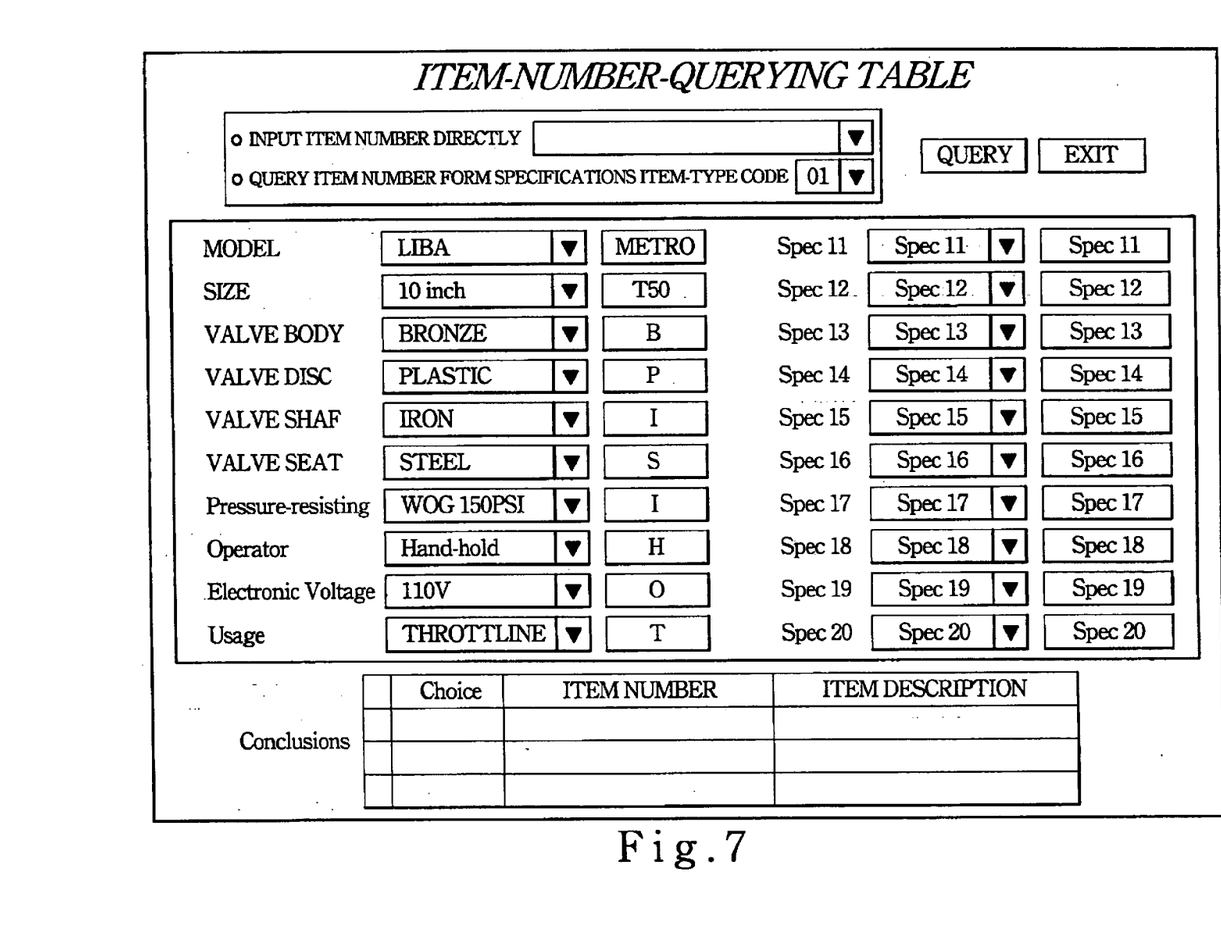
FIG. 7 illustrates the item-number-querying table in accordance with the present invention.

FIG. 6 illustrates a flow diagram of querying the item number for each item in accordance with the present invention. When the query procedure starts (step 301), an item-number-querying table is shown (step 302). As shown in FIG. 7, the item-number-querying table provides two options for querying item numbers, i.e. "INPUT ITEM NUMBER DIRECTLY" and "QUERY ITEM NUMBER FROM SPECIFICATIONS", respectively.

Thereafter, one of the two options is chosen (step 303). If "INPUT ITEM NUMBER DIRECTLY" is chosen, it is necessary to input a part or the whole of the item number of the item to be investigated (step 304). After a part of the item number is input, each item with an item number containing the part are disclosed (step 305), and their item numbers and their corresponding brief descriptions are shown on the item-number-querying table (step 306). On the other hand, if the option "QUERY ITEM NUMBER FROM SPECIFICATIONS" is chosen, it is necessary to decide the item-type code of the item to be investigated (step 307). After the item-type code is decided, its corresponding specification properties are shown on the item-number-querying table (step 308). Next, all of the specification properties are filled in according to the properties of the queried item (step 309), and their item numbers and corresponding brief descriptions are shown on the item-number-querying table (step 306). The specification properties are decided by selecting from a pull-down manual, or by directly inputting.

The present invention has the following advantages:

1. The present invention allows a user to create his/her personal encoding way for a variety of kinds of items. The user can use the customary encoding way of his/her industry without transformation. No transitional period is needed for the user to adapt the new ERP software. For this reason, the education period and cost for the purchase people, the production management people, and the material management-people can be largely decreased.

2. According to the present invention, the item number is composed of the representative codes, and the representative codes represent all of the important specifications of an item. For this reason, it is not necessary for a user to realize the important specifications and properties of an item by querying on the computer. The convenience for purchasing, checking, importing and exporting items can be significantly enhanced. Furthermore, the present invention also improves the efficiency and convenience of research people, purchase people, and sales people when they fill out purchase orders.

3. Because the item number according to the present invention is defined by the important specifications of an item, the query and access operations between different tasks in the ERP system can be largely reduced. For this reason, the operation speed and operation efficiency of the ERP system disclosed in the present invention can be greatly promoted.

4. According to the present invention, all of the items can be encoded without repeat. Furthermore, each of the items can be automatically encoded in accordance with its specification and property. The miscellaneous manual operation for encoding items can be avoided.

5. In addition to query the item number of an item by directly inputting a part or the whole of the item number, the other option is provided in the present invention to query the item number according to the specifications or properties of the item. The query efficiency can be largely enhanced.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What we claimed is:

1. A computer implementing method for generating an item number for an item, comprising the steps of:
   a) selecting an item type of the item from an item-number-encoding table having a plurality of item types, each of the item types having different specification descriptions;
   b) showing the specification descriptions of the item type of the item on the item-number-encoding table;
   c) selecting a specification description on the item-number-encoding table;
   d) showing a code table of the specification description, the code table comprising a plurality of specification codes and a plurality of specification names corresponding to the specification codes;
   e) selecting one of the specification names and a corresponding specification code;
   f) repeating the selecting step c) to the selecting step e) until all the specification descriptions of the item type of the item are selected; and
   g) combining the specification codes of all the specification description to generate the item number of the item.

2. The method of claim 1, wherein the combining step g) is followed by the step of checking whether the item number already existed; and,
   if 'YES' in step h), releasing a message to inform a user; and
   if 'NO' in step h), confirming the item number.

3. The method of claim 1, wherein the combining step g) is followed by the step of saving the item number to an item-number file.

4. The method of claim 1, wherein the item-number-encoding table of the selecting step a) is established by the following steps:
   a) creating an item-type table and defining a sequence of specification codes on the item-type table;

b) creating a code table for each of the specification codes and inputting a specification name for each of the specification code;

c) inputting an item-type code into the item-type table; and d) inputting a specification description into the item-type table, creating the item-number-encoding table, and selecting the item type of the item from the item-number-encoding table.

5. The method of claim 4, wherein after inputting specification codes to show said specification descriptions of said item type, the inputting step d) includes the step of inputting an item-type description for each kind of item types.

6. The method of claim 4, wherein after inputting specification codes to show said specification descriptions of said item type, the inputting step d) includes the showing specification description for each of said specification codes.

7. The method of claim 1, after electing one of specification descriptions of said item type to generate said item number for each of said items, the selecting step a) further includes the steps of querying an item number of a specific item, comprising:

a) inputting an item number of said specific item;

b) receiving a part of said item number of said specific item;

c) disclosing items with item numbers containing said part; and     d) showing said item numbers of said items.

8. The method of claim 1, wherein after generating said item number for each of said items, the combining step g) further includes the steps of querying an item number of a specific item, comprising:

a) receiving an option of querying item numbers from specifications;

b) receiving an item-type code of said specific item;

c) showing corresponding specification properties of said item-type code;

d) filling said specification properties according to real properties of said specific item; and     e) showing said item number of said specific item.

* * * * *